United States Patent [19]
Hemena et al.

[11] Patent Number: 6,157,555
[45] Date of Patent: Dec. 5, 2000

[54] CURRENT LIMITER RESPONSIVE TO CHANGING PARALLEL POWER SUPPLY CAPACITY

[75] Inventors: William Hemena, Raleigh; Randhir S. Malik, Cary, both of N.C.

[73] Assignee: International Business Machines Corporation, Armonk, N.Y.

[21] Appl. No.: 09/437,202

[22] Filed: Nov. 9, 1999

[51] Int. Cl.$^7$ .................................................. H02M 7/00
[52] U.S. Cl. ................... 363/71; 307/55; 307/60
[58] Field of Search ................... 307/32, 53, 55, 307/60; 363/69, 71

[56] References Cited

U.S. PATENT DOCUMENTS

| | | | |
|---|---|---|---|
| 4,349,879 | 9/1982 | Peddie et al. | 307/35 |
| 4,425,613 | 1/1984 | Shelly | 363/71 |
| 4,459,492 | 7/1984 | Rogowsky | 363/71 |
| 4,609,828 | 9/1986 | Small | 363/71 |
| 4,717,833 | 1/1988 | Small | 307/53 |
| 4,853,832 | 8/1989 | Stuart | 363/56 |
| 4,924,170 | 5/1990 | Henze | 363/71 |
| 5,073,848 | 12/1991 | Steigerwald et al. | 307/29 |
| 5,179,493 | 1/1993 | Imanishi | 307/89 |
| 5,266,838 | 11/1993 | Gerner | 307/19 |
| 5,319,536 | 6/1994 | Malik | 363/65 |
| 5,381,554 | 1/1995 | Langer et al. | 714/14 |
| 5,488,532 | 1/1996 | Mrowiec et al. | 361/63 |
| 5,627,740 | 5/1997 | Johari | 363/78 |
| 5,745,670 | 4/1998 | Linde | 714/22 |

FOREIGN PATENT DOCUMENTS

| | | | |
|---|---|---|---|
| 55-154617 | 12/1980 | Japan | H02M 7/155 |

OTHER PUBLICATIONS

"Automatic Multi–Level Overcurrent Protection Circuit", IBM Technical Disclosure Bulletin, vol. 28, No. 3, Aug. 1985, pp. 1054–1056.

"Fast Undervoltage Sensing Circuit Provides Short Circuit Protection For VHF Resonant Converters", IBM Technical Disclosure Bulletin, vol. 27, No. 11, Apr. 1985, pp. 6574–6576.

"Auto–Programmable Over–Current Power Supply Detection Circuit", IBM Technical Disclosure Bulletin, vol. 30, No. 3, Aug. 1987, pp. 1319–1320.

"Logic Card Voltage Fault Senor System", IBM Technical Disclosure Bulletin, vol. 20, No. 10, Mar. 1978, pp. 3840–3841.

*Primary Examiner*—Peter S. Wong
*Assistant Examiner*—Bao Q. Vu
*Attorney, Agent, or Firm*—Andrew Dillon; Bernard D. Bogdon

[57] ABSTRACT

A system and method for adjusting the maximum allowable current limit for each of a plurality of parallel power supplies within an N+1 power supply system in response to dynamic variations in the total supply current capacity of the N+1 power supply system. A plurality of parallel supplies make up the N+1 power supply which provides power to a load. A sensor within each of the parallel power supplies determines an operating status of each of the parallel power supplies. A detector circuit in communication with the sensors translates the operating status determination into a supply current capacity signal. Finally, a current limit adjustment circuit generates a current limit signal in response to the supply current capacity signal, such that the maximum allowable current limit for each parallel power supply is adjusted while maintaining the overall power supply VA limit for the N+1 power supply.

10 Claims, 4 Drawing Sheets

Fig. 1 *Prior Art*

CURRENT LIMITER RESPONSIVE TO CHANGING PARALLEL POWER SUPPLY CAPACITY

BACKGROUND OF THE INVENTION

1. Technical Field

The present invention relates in general to regulating power supplies, and in particular to a system and method for regulating the total power delivered from a parallel power supply. Still more particularly, the system and method of the present invention relate to dynamically adjusting the maximum current limit for each of a plurality of parallel power supplies in accordance with variations in available power supply capacity, such that the total available output power never exceeds a maximum allowable limit.

2. Description of the Related Art

Conventional power supply systems often utilize multiple, parallel power supply circuits for improved adaptability to load variations and also for increased reliability. Representative parallel power supply systems (referred to alternatively in the art as "N+1 power systems") are described in U.S. Pat. No. 5,319,536 (issued Jun. 7, 1994, to R. Malik), U.S. Pat. No. 5,266,838 (issued Nov. 30, 1993 to Gerner), and U.S. Pat. No. 5,745,670 (issued Apr. 28, 1998 to Linde).

FIG. 1 illustrates a conventional parallel power supply system 101 comprising three power supplies, PS1 102, PS2 103, and PS3 104 that together provide a source of power to electrical system 106. For safety reasons, a maximum allowable power output limit is imposed on each of PS1 102, PS2 103, and PS3 104, and also on the total power delivered from power supply system 101 to electrical system 106.

As seen in FIG. 1, each of the three power supplies in system 101 employs an individual current sense resistor ($R_{CS}1$ 108, $R_{CS}2$ 110, and $R_{CS}3$ 112 for PS1 102, PS2 104, and PS3 106, respectively). $R_{CS}1$ 108, $R_{CS}2$, and 110 $R_{CS}3$ 112 are utilized to detect the level of current on each parallel supply line ($I_1$ 122, $I_2$ 124, and $I_3$ 126). An additional current sense resistor, $R_{CS}$ 114, is inserted within a power backplane 118 where the outputs of all three power supplies converge.

$R_{CS}$ 114 is utilized to sense the total supply current, $I_T$ 120, which is equal to the sum of $I_1$ 122, $I_2$ 124, and $I_3$ 126. Assuming that the Volt-Amp (VA) limit for electrical system 106 is the same as that for each power supply, the maximum allowable current level for $I_T$ 120 is three times the maximum level permitted for each individual power supply circuit ($I_1$ 122, $I_2$ 124, and $I_3$ 126). To ensure compliance with the maximum allowable VA limit, $R_{CS}$ 114 monitors the magnitude of $I_T$ 120, and if an excessive level of current (relative to $V_o$ 116) is detected, power supply system 101 is forced to shutdown. Current sense resistor $R_{CS}$ 114 must be a carefully selected resistor having a minimum voltage drop to avoid reducing rail-to-rail voltage. This low voltage drop requirement necessitates a precise, low resistance value for $R_{CS}$ 114. Such precision and low resistance characteristics dramatically increase the cost of $R_{CS}$ 114 and also require a low offset comparator. The utilization of an additional current sense resistor such as $R_{CS}$ 114 thus results in reduced power supply efficiency as well as increased cost of power supply system 101.

Modern circuits have much lower operating voltages than previous generations of integrated circuits. A current standard for state-of-the-art integrated circuits is 1.8 volts. Thus an additional voltage drop caused by the a conventional current sense resistor may result in an unacceptable decrease in the rail-to-rail voltage.

It would therefore be desirable to provide an indirect (non-resistive) method for determining total available parallel power supply capacity and dynamically adjusting the output current level of each parallel power supply in response thereto, such that the VA levels for all circuits within an N+1 power supply are maintained below the maximum allowable limit.

SUMMARY OF THE INVENTION

It is therefore one object of the present invention to provide an improved system and method for regulating the total power delivered from a plurality of parallel power supplies.

It is another object of the present invention to provide a system and method for dynamically adjusting the output current limit for each of a plurality of parallel power supplies in accordance with variations in total available power supply capacity, such that the level of output power from the power supply never exceeds a maximum allowable limit.

The foregoing objects are achieved as is now described. An improved power regulation system and method are disclosed for adjusting the maximum allowable current limit for each of a plurality of parallel power supplies within an N+1 power supply system in response to dynamic variations in the total supply current capacity of the N+1 power supply system. A plurality of parallel power supplies comprise the N+1 power supply which provides power to a load. A sensor within each of the parallel power supplies determines an operating status of each of the parallel power supplies. A detector circuit in communicative contact with the sensors translates the operating status determination into a supply current capacity signal. Finally, a current limit adjustment circuit generates a current limit signal in response to the supply current capacity signal, such that the maximum allowable current limit for each parallel power supply is adjusted while maintaining the overall power supply VA limit for the N+1 power supply.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
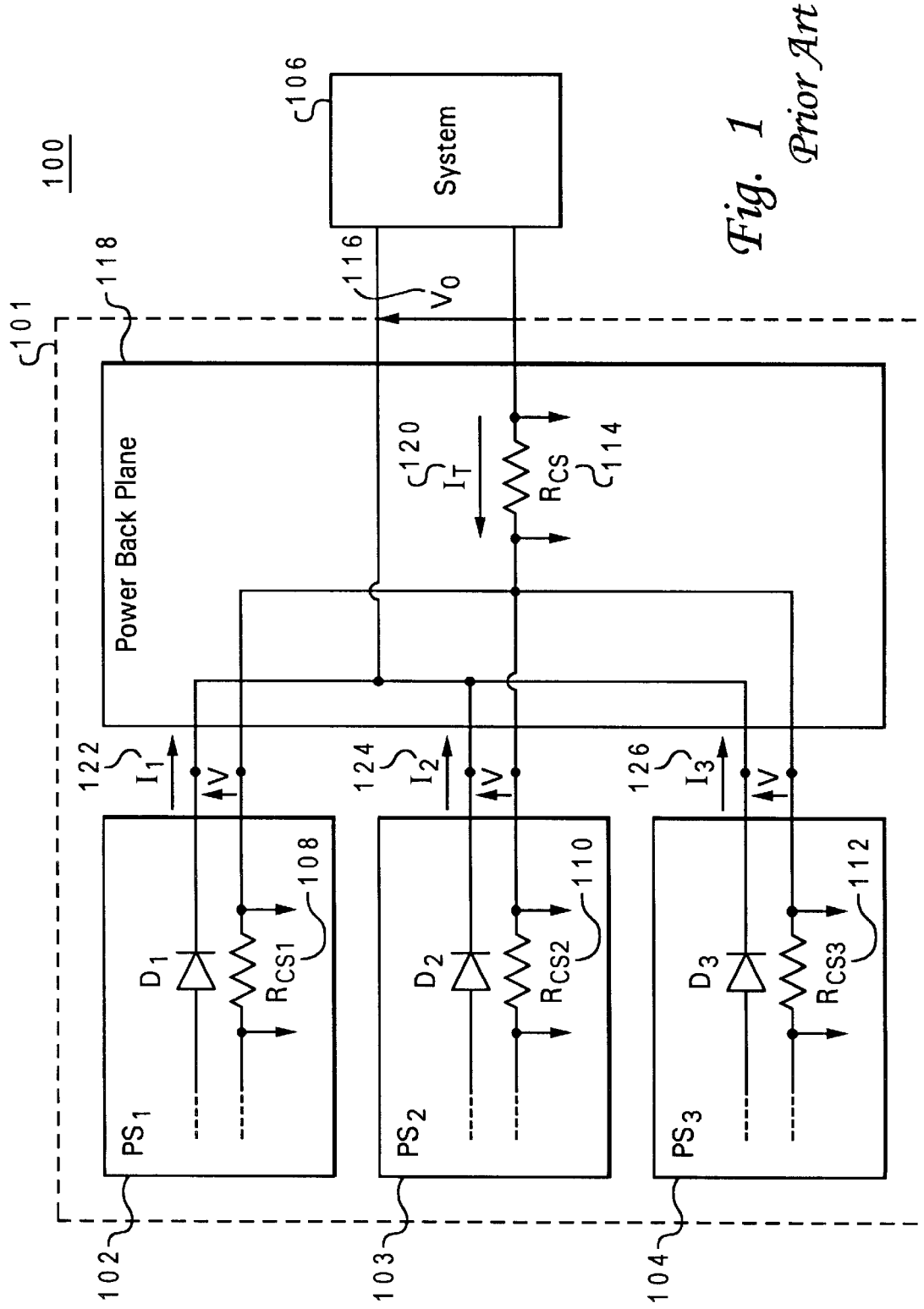
FIG. 1 depicts a schematic representation of a conventional power limit circuit for a parallel power supply system.

Parallel power supply systems (often referred to as N+1 power supplies) are well-known in the art. The total Volt- Amp (VA) power output from an N+1 power supply is supplied utilizing multiple AC/DC converters connected in parallel. The total VA supplied to the load from an N+1 power supply, as well as the power output from each individual converter, must be maintained below a specified safety limit. For many systems this limit is specified as 240 VA. As explained with reference to FIG. 1, current sense resistors are often utilized within each converter to ensure compliance with the maximum allowable VA limit. As further illustrated in FIG. 1, an additional current sense element, such as $R_{CS}$ 114, has been conventionally required to monitor the cumulative power supplied by the parallel converters to ensure compliance with the maximum power limit.

The present invention provides an improved power regulator which utilizes real-time variations in the available supply current capacity as a means for indirectly maintaining the maximum power output limit. The present invention provides an efficient and economical means for dynamically adjusting the current limit from each parallel converter, thus eliminating the need for an additional current sense element. The value of available supply current (referred to hereinafter as "supply current capacity") is monitored and translated into a current limit feedback signal within a conversion and amplification feedback unit. By accounting for real-time changes in total power supply capacity, the system and method of the present invention ensure VA limit compliance while providing the maximum available source current to accommodate fluctuations in power supply load. In one embodiment of the present invention, the total output current capacity for an N+1 power supply is specified in proportion to the number of currently operating parallel power supplies.

Figure 2:
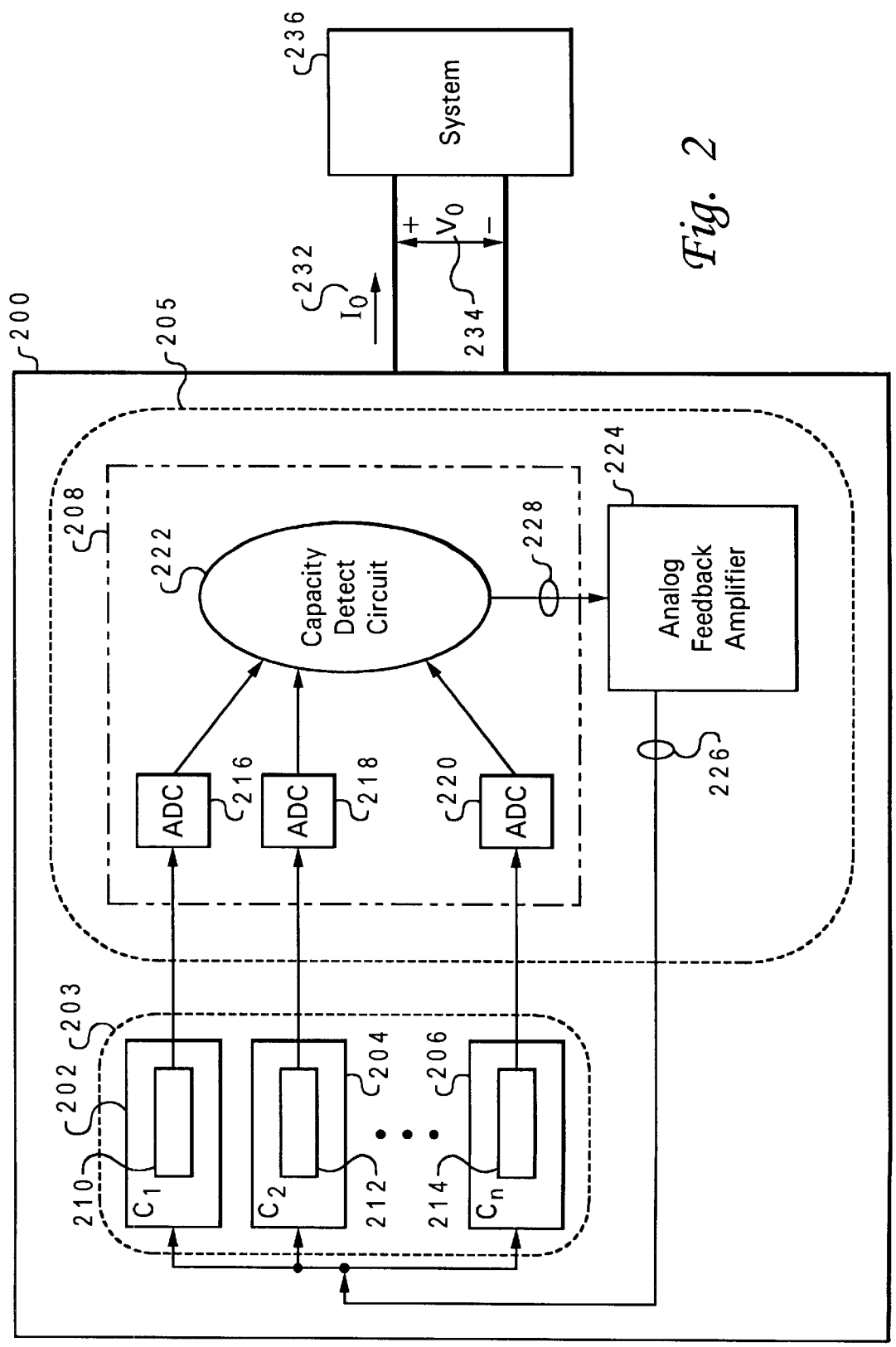
FIG. 2 is a block diagram illustrating a preferred embodiment of the dynamic power limit system of the present invention.

FIG. 2 is a block diagram illustrating a power supply system 200 in accordance with the system and method of the present invention. As seen in FIG. 2, power supply system 200 comprises an N+1 power supply 203 which provides a supply voltage, $V_o$ 234, and a supply current, $I_o$ 232, for a system load 236. As illustrated in FIG. 2, N+1 power supply 203 comprises n parallel AC/DC converters, $C_1$ 202 through $C_n$ 206, each contributing a partial current, $I_p$ (not depicted), to $I_o$ 232 in accordance with the following relation:

$$I_p = I_o/p; \qquad (1)$$

wherein p is equal to the subset of n converters that are currently operating. As further depicted in FIG. 2, $C_1$ 202, $C_2$ 204, and $C_n$ 206 include sensors 210, 212, and 214, respectively, which provide a means for monitoring the $I_p$ supplied from each converter. If any such individual current level causes the corresponding VA output from any converter to exceed a pre-determined limit, the corresponding current sensor will deliver a shut down signal for that converter.

Power supply system 200 further comprises a current regulator 205 which is constructed and which operates in accordance with the system and method of the present invention. Current regulator 205 includes a supply capacity sensor 208 and a feedback amplifier 224. As illustrated in FIG. 2, supply capacity sensor 208 receives a current sense signal from each of sensors 210 through 214. In the depicted embodiment, these current sense signals provide a real-time indication of the operating status of each power converter. The operating status of each of $C_1$ 202 through $C_n$ 206 is in turn utilized as the supply capacity metric for N+1 power supply 203. Analog-to-digital converters (ADCS) 216, 218 and 220 provide suitable binary translations for a detector circuit 222. Detector circuit 222 comprises a binary combinatorial logic circuit which translates the current sense inputs from sensors 210 through 214 into a corresponding supply capacity signal 228.

The maximum permissible value for $I_o$ 232 may be determined in accordance with the following relation:

$$\text{Maximum Volt-Amp (VA)} = |V_o| 234 \times |I_o| 232, \qquad (2)$$

wherein Maximum VA is a pre-determined value equal to the maximum allowable power limit. $V_o$ 234 is maintained as close as possible to pre-determined rail-to-rail voltage level requirements of electrical system 236, and is therefore a relative constant. Maximum VA is therefore observed as a function of variations in $I_o$ 232 which fluctuates in response to shifting electrical loads of system 236.

If all n power converters are currently operating, and assuming each converter contributes equally to $I_o$ 232, then each converter has an output current, $I_p$, (not depicted) having a magnitude that may be determined in accordance with the following relation:

$$|I_p| = (|I_o| 232)/n. \qquad (3)$$

Rather than monitoring and reacting to actual current levels $I_p$ and $I_o$ 232, the present invention anticipates the maximum allowable level for $I_p$, referred to hereinafter as $I_{max}$, in accordance with the current supply capacity of N+1 power supply system 230. The power regulator of the present invention monitors the total output current capacity (not to be confused with actual output current, $I_o$ 232) of N+1 power supply system 230 utilizing sensor circuit 208.

As depicted in FIG. 2, supply capacity signal 228 is delivered from supply capacity sensor 208 to feedback amplifier 224. Feedback amplifier 224 includes a current limit adjustment circuit (not depicted) which as explained in further detail with reference to FIGS. 3A and 3B, generates a current limit signal 226 in response to changes in supply capacity signal 228. In this manner, current regulator 205 dynamically maintains the VA limit for N+1 power supply 203 utilizing changes in current supply capacity of $C_1$ 202 through $C_n$ 206.

Figure 3A:
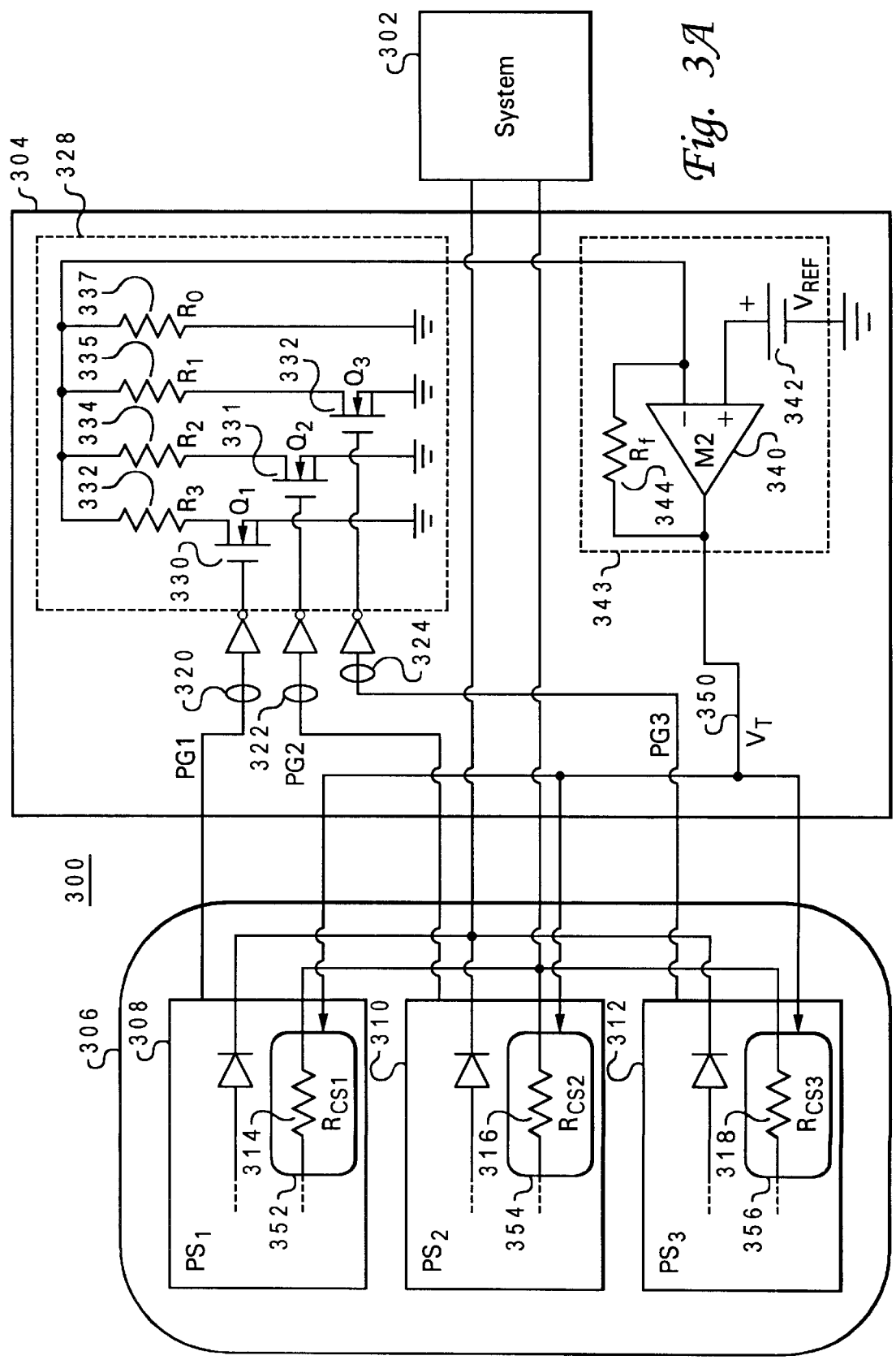
FIG. 3A depicts a schematic representation of one embodiment of the dynamic current limit adjustment circuit of the present invention accounting for variations in N+1 power supply capacity.

Turning now to FIG. 3A, there is depicted a schematic representation of a dynamic current limit adjustment circuit accounting for variations in N+1 power supply capacity in accordance with the system and method of the present invention. As illustrated in FIG. 3A, regulator circuit 300 includes an N+1 power supply 306 which is regulated through a power backplane circuit 304 while providing power to a system load 302. As illustrated in FIG. 3A, N+1 power supply 306 comprises three parallel power supplies (analogous to the power converter of FIG. 2) PS1 308, PS2 310, and PS3 312. Although not depicted in FIG. 3, each of these power supplies is connected to an AC input and provides power to load 302 via decoupling diodes. Within PS1 308, PS2 310, and PS3 312, reside VA limit circuits 352, 354, and 356 that include current sensing resistors RCS1 314, RCS2 316, and RCS3 318, respectively. In the depicted embodiment, RCS1 314, RCS2 316, and RCS3 318 serve as individual current regulation devices for each of PS1 308, PS2 310, and PS3 312.

Figure 3B:
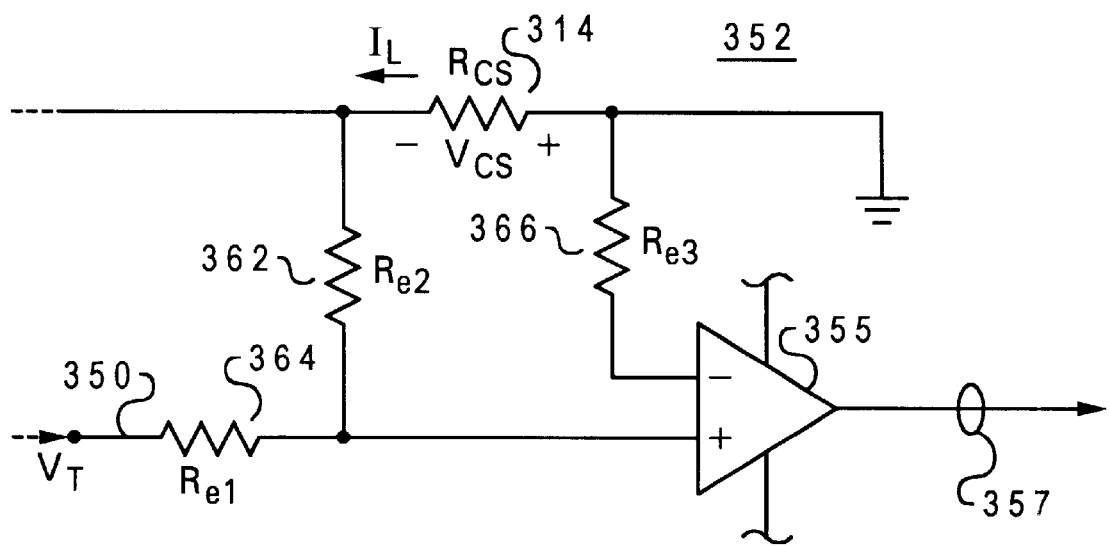
FIG. 3B illustrates a current limit adjustment circuit in accordance with the system and method of the present invention.

FIG. 3B further illustrates the construction and operating characteristics of VA limit circuit 352 as may be utilized as any or all of VA limit circuits 352, 354, and 356. VA limit circuit 352 is comprised of sensing resistor RCS1 314 across which a current sense voltage, Vcs, is monitored such that the output current, $I_L$, can be monitored and regulated in accordance with the teachings of the present invention. A threshold voltage signal, $V_T$ 350, is applied to an input impedance network comprising Rl1 364, Rl2 362, Rl3 366, and RCS1 314. $V_T$ 350 serves as the reference against which Vcs is compared in order to dynamically adjust the maximum allowable value for $I_L$ ($I_{max}$) as necessary. With reference to FIGS. 3A and 3B, $I_{max}$ is defined as the value of $I_L$ at which the voltage levels at the inverting and non-inverting terminals of comparator 355 will be sufficiently offset, such that a shutdown signal 357 terminates operation of PS1 308. $I_{max}$ varies as a function of $V_T$ 350 in accordance with the following relation:

$$I_{max} = kV_T, \quad (4)$$

wherein k is a constant equal to [|Rl2|/(|Rcs|×|Rl1|)]. It should be noted that relation (4) expresses the dependence of the maximum allowable value, $I_{max}$, not the actual value of $I_L$. As illustrated by FIG. 3B and relation (4), $V_T$ 350 provides a means by which $I_{max}$ may be adjusted in real-time. If $I_L$ exceeds $I_{max}$, the VA output from the host power supply (i.e. the product of $I_L$ and the output voltage level from the supply) will exceed the pre-determined maximum allowable VA level, and a shutdown signal 357 from a comparator 355 will result.

Returning to FIG. 3A, and in an important feature of the present invention, each of PS1 308, PS2 310, and PS3 312 also provide a "power status" signal to power backplane circuit 304. PG1 320, PG2 322, and PG3 324 illustrate such power status signals which are generated within PS1 308, PS2 310, and PS3 312, utilizing devices depicted as sensors 210, 212, and 214 in FIG. 2. In one possible embodiment of the present invention, a current sense voltage signal such as Vcs (FIG. 3B) may be converted into a digital signal and utilized as a power status signal. As bimodal binary signals, power status signals 320, 322, and 324 indicate whether their respective power supplies are operating (i.e. power good) or not.

In the illustrated embodiment, while each of the parallel power supplies is operating normally, its corresponding power status signal remains high (logic 1). If power from one or more of the power supplies is interrupted, due to failure or removal, its power status signal drops from high to low (logic 0). PG1 320, PG2 322, and PG3 324 are fed through inverters into a detector circuit 328 comprising an equivalent resistance network 326 and a feedback amplifier 343. Detector circuit 328 senses and reacts to changes in the supply current capacity of N+1 power supply 306 as characterized by power status signals 320, 322, and 324. Having three binary inputs, detector circuit 328 operates as a multiple input logic switch driven in accordance with the states of PG1 320, PG2 322, and PG3 324. Resistance network 326 comprises switch transistors Q1 330, Q2 331, and Q3 333 which incrementally increase or decrease the equivalent resistance of the network in discrete units as determined by the resistance values of resistors R3 332, R2 334, R1 335 and RO 337. PG1 320, PG2 322, and PG3 drive Q1 330, Q2 331, and Q3 333, respectively. While PG1 320, PG2 322, and PG3 324 are set to a logic 1, the inverted inputs into Q1 330, Q2 331, and Q3 333 remain at a logic 0, thus maintaining Q1 330, Q2 331, and Q3 333 in a disabled or "off" state. If any of power status signals PG1 320, PG2 322, or PG3 324 go low, the corresponding input goes from logic 0 to a logic 1, resulting in one or more of the switches being switched on.

For example, shifting PG2 322 from a logic 1 (indicating PS2 310 currently operating) to a logic 0 (indicating PS2 310 no longer operating), will cause Q2 331 to switch on thus changing the equivalent resistance, $R_{eq}$, of detector circuit 328 from $R_{eq}$=RO to $R_{eq}$=RO∥R2 (RO 337 and R2 334 in parallel). Any additional failures (or removals) of parallel power supplies within N+1 power supply 306 would similarly reduce $R_{eq}$ in accordance with the number of resistors added in parallel. By detecting the number of operating power supplies within N+1 power supply 306, detector circuit 328 modulates $R_{eq}$ in accordance with a fault condition or power supply removal. As explained with reference to relation (5) below, the modulation of $R_{eq}$ serves as a supply capacity signal translation of the operating status provided by PG1 320, PG2 322, and PG3 324.

As further illustrated in FIG. 3A, the $R_{eq}$ of detector circuit 328 is applied to the inverting terminal of an operational amplifier (op-amp) M2 340 within feedback amplifier 343. M2 340 is biased by feedback resistor $R_f$ 344, and $R_{eq}$, and $V_{REF}$ 342. The input/output amplification characteristics of a non-inverting amplifier such as M2 340 are well-known in the art. One such characteristic is the voltage gain, $A_v$, of a non-inverting amplifier as measured by the ratio of $V_T$ 350, to the input reference voltage, $V_{REF}$ 342. The threshold voltage level $V_T$ 350 will increase as $R_{eq}$ decreases in accordance with the following op-amp gain formula:

$$A_v = (V_T\ 350/V_{REF}\ 342) = 1 + [(R_f\ 344)/(R_{eq})]. \quad (5)$$

$V_T$ 350 is then fed back to VA limit circuits 352, 354, and 356 as depicted in FIG. 3B.

While the invention has been particularly shown and described with reference to a preferred embodiment, it will be understood by those skilled in the art that various changes in form and detail may be made therein without departing from the spirit and scope of the invention.

What is claimed is:

1. An overcurrent protection circuit for adjusting the current limit for each of a plurality of parallel power supplies within an power supply system in response to dynamic variations in the total supply current capacity of said N+1 power supply system, said overcurrent protection circuit comprising:

an operating status sensor within each of a plurality of parallel power supplies within said N+1 power supply for determining whether each of said plurality of parallel power supplies is currently operating;

a detector circuit in communication with said operating status sensors for translating said operating status determination for each of said plurality of parallel power supplies into a supply current capacity signal; and a current limit adjustment circuit generating a current limit signal in response to said supply current capacity signal, such that the current limit for each of said plurality of parallel power supplies adaptively compensates for changes in supply current capacity while maintaining the maximum allowable volt-amp limit for said N+1 power supply.

2. The overcurrent protection circuit of claim 1, wherein each of said plurality of parallel power supplies includes a VA limit circuit which generates a current sense signal, and wherein said VA limit circuit comprises a comparator which compares said current limit signal to said current sense signal in order to produce a VA limit signal.

3. The overcurrent protection circuit of claim 1, wherein said detector circuit includes a variable resistance circuit providing an equivalent resistance that is modulated in accordance with said operating status determination for each of said plurality of parallel power supplies to produce said supply current capacity signal.

4. The overcurrent protection circuit of claim 3, wherein said current regulator circuit further comprises switching means for reducing or increasing said equivalent resistance in response to detected variations in supply current capacity.

5. The overcurrent protection circuit of claim 3, wherein said variable resistance circuit comprises a plurality of switched parallel resistors connected in parallel with one unswitched resistor, and wherein said plurality of switched resistors are each receiving one of said operating status determinations.

6. The overcurrent protection circuit of claim 3, wherein said current limit adjustment circuit comprises a non-inverting feedback amplifier having an inverting terminal to which said supply current capacity signal is applied and having a non-inverting terminal to which a reference voltage is applied.

7. The overcurrent protection circuit of claim 6, wherein said inverting terminal is coupled to said equivalent resistance.

8. A method for adjusting a maximum allowable current limit for each of a plurality of parallel power supplies within an N+1 power supply system in response to dynamic variations in the total supply current capacity of said N+1 power supply system, said method comprising:

determining an operating status of each of said plurality of parallel power supplies;

translating said operating status determination into a supply current capacity signal; and generating a current limit signal in response to said supply current capacity signal, such that said maximum allowable current from each of said plurality of parallel power supplies is adjusted to conform to the current supply capacity as measured by a present number of operating parallel power supplies within said N+1 power supply system.

9. The method of claim 8, wherein a plurality of operating status sensors are utilized to perform said step of determining an operating status of each of said plurality of parallel power supplies, and wherein each of said plurality of parallel power supplies includes a VA limit circuit which generates a current sense signal, said method further comprising the step of uniquely applying each of said current sense signals to said plurality of operating status sensors in order to produce said operating status determination for each of said plurality of parallel power supplies.

10. The method of claim 8, wherein said N+1 power supply system includes a feedback amplifier, and wherein said generating step further comprises the step of adjusting the feedback gain of said feedback amplifier in accordance with changes in said supply capacity signal.

* * * * *